Aug. 20, 1957     C. W. KUHN     2,803,722
PROTECTIVE SWITCHES

Filed Oct. 17, 1955                                 2 Sheets-Sheet 1

Inventor
Clarence W. Kuhn
By H. R. Rather
Attorney

Aug. 20, 1957

C. W. KUHN 2,803,722

PROTECTIVE SWITCHES

Filed Oct. 17, 1955

Inventor
Clarence W. Kuhn.
By H R Rather
Attorney

United States Patent Office 2,803,722
Patented Aug. 20, 1957

2,803,722
PROTECTIVE SWITCHES

Clarence W. Kuhn, Wauwatosa, Wis., assignor to Cutler-Hammer, Inc., Milwaukee, Wis., a corporation of Delaware Application October 17, 1955, Serial No. 540,831

12 Claims. (Cl. 200—124)

This invention relates to improvements in protective switches. In particular it relates to thermal responsive overload switches.

While the invention is applicable to other switches, it is particularly adapted for use in protective switches of the type shown in Kuhn Patent No. 2,673,268, issued March 23, 1954, and is an improvement. A specific object of the invention is to improve this and similar switches.

A more general object is to provide a protective switch in which the degree of overload against which protection is provided is automatically variable.

Overload protection is provided to protect against overheating of circuits and devices by excessive current flow for excessive periods of time. Another object of the invention is to provide a thermally responsive mechanism which measures the magnitude and duration of current to the device to be protected in a manner permitting more closely simulating the heating in the device to be protected than has been possible in prior mechanisms. And to accomplish these objects and further to vary, as desired, the thermal response of the mechanism with changes in ambient temperature is another object of the invention.

Certain of these and other objects and advantages of the invention which will hereinafter appear, are realized in part by the provision of a thermal element in which some part moves or trips in response to temperature change to effect switching in the circuit of the device to be protected, a heater element connected in series in the circuit and another thermal responsive element which when heated causes automatically relative movement between the first mentioned thermal element and heater element and heating of said first mentioned thermal element as a function of the magnitude and duration of the current to the device to be protected.

Both thermal elements are heated by the heater element. In adition, one or both may be connected in the circuit of the device to be protected either in series or in parallel with the heater element so that it is heated by current to the device to be protected. Whether the thermal elements are so connected and which kind of connection is used is determined by which connection in a given application will more closely simulate, in heating the solder element, heating of the device to be protected. The first thermal element may be connected to the second to be carried therewith toward and away from the heater element as an incident to heating of the second thermal element. Or, conversely, the heater element may be carried by the second thermal element toward and away from the first thermal element. It is considered preferable, for most applications, that the second thermal element be a bimetallic element heated solely by the heater element and that the first thermal element be a solder element fixed to and carried by the bimetallic element toward and away from the heater element. This preferred construction is illustrated in the accompanying drawings in which:

Figure 1:
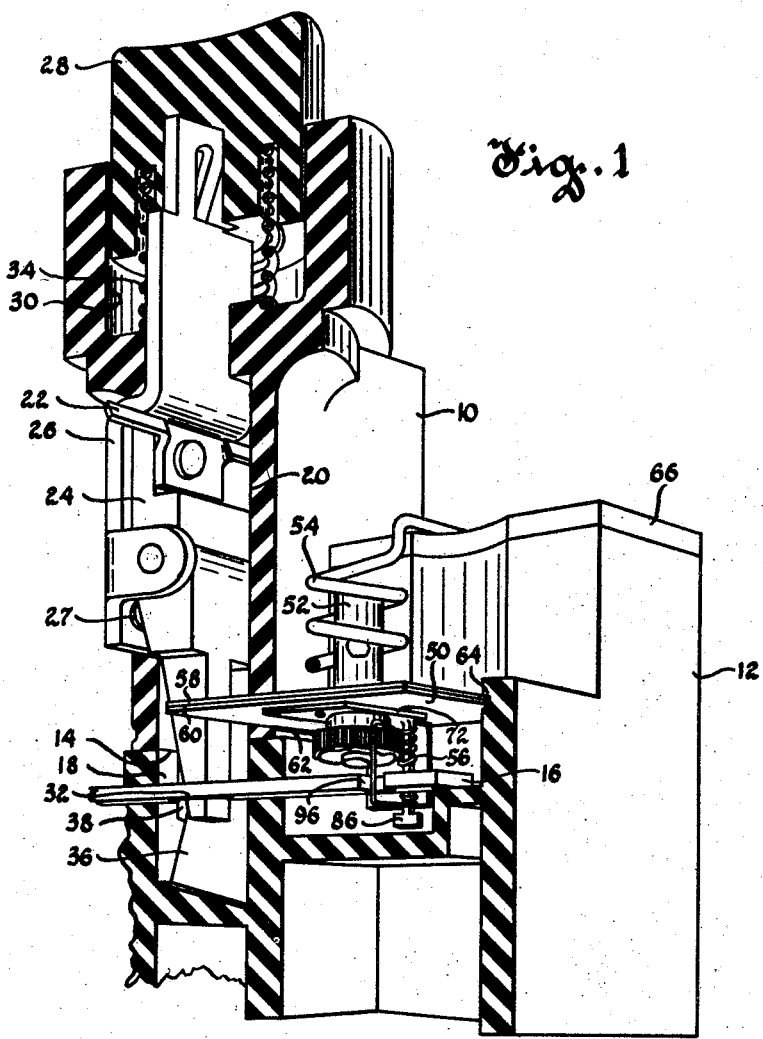
Figure 1 is a perspective view, partly in section, of a fragment of a protective switch embodying the invention.

Referring to Fig. 1 of the drawing, the numerals 10 and 12 designate insulating bases for a switch and overload actuating mechanism for the switch, respectively. The bases 10 and 12 are joined along the line 14 and are held together with screws (not shown) to form a single unit. A slide bar 16, disposed in base 12, is free to slide to the left and right in the drawing but is held against transverse and up and down movement by conformations in the base 12.

The slide bar 16 extends through a recess 18 in base 12 which communicates with a recess 20 in base 10. Bar 16 provides an operative connection between the overload actuating mechanism and the switch and its operating mechanism. The latter are disposed in recesses 18 and 20.

The switch comprises a movable bridging contact 22 and a pair of fixed contacts (not shown). The bridging contact is shown in position to contact and bridge the fixed contacts. It is rockably mounted on an insulating lever 24. The lever is pivotally mounted on shaft 26. The shaft is secured at its upper end to a push button 28 which can be moved up and down in a recess 30 which communicates with recess 20. The lower end of lever 24 is disposed in a notch 32 in slide bar 16. When the latter is moved to permit movement of the lower end of lever 24 to the left in the drawing under the influence of a bias spring 27, the upper end of the lever will be moved away from shaft 26 and the bridging contact 22 will be disengaged from the fixed contacts whereupon the push button 28, shaft 26, lever 24 and bridging contact 22 will be moved up by a spring 34 until a stop or a pair of auxiliary contacts (not shown) is reached.

A reset member 36, having a projection which extends up into notch 32 of slide bar 16, rests at the bottom of recess 18. An operating finger 38 for rocking the reset member is attached to the shaft 26. When the button 28 is pushed down against the bias of spring 34, the shaft 26 carries bridging contact 22 below the fixed contacts and moves finger 38 into engagement with reset member 36. The latter is rocked so that its upward projection moves right in notch 32 to engage slide bar 16 and move it right. Movement of the slide bar to the right causes or permits movement of the lower end of lever 24 to the right. Thus the upper end of lever 24 moves left in the drawing to carry bridging contact 22 under the fixed contacts. Then when the push button is released the whole switch assembly moves up until bridging contact 22 engages the fixed contacts.

Thus depressing button 28 to close the switch moves the slide bar 16 to the right. The switch is closed when the button is released and has the position shown in Fig. 1. As will be more fully explained, when an overload occurs the slide bar 16 is moved to the left to disengage the switch contacts and the push button moves up to indicate that the switch is open.

While no further explanation of the switch and its operating mechanism is required for understanding and practice of this invention, a detailed description of the switch may be found, if desired, in said Kuhn Patent No. 2,673,268.

Figure 2:
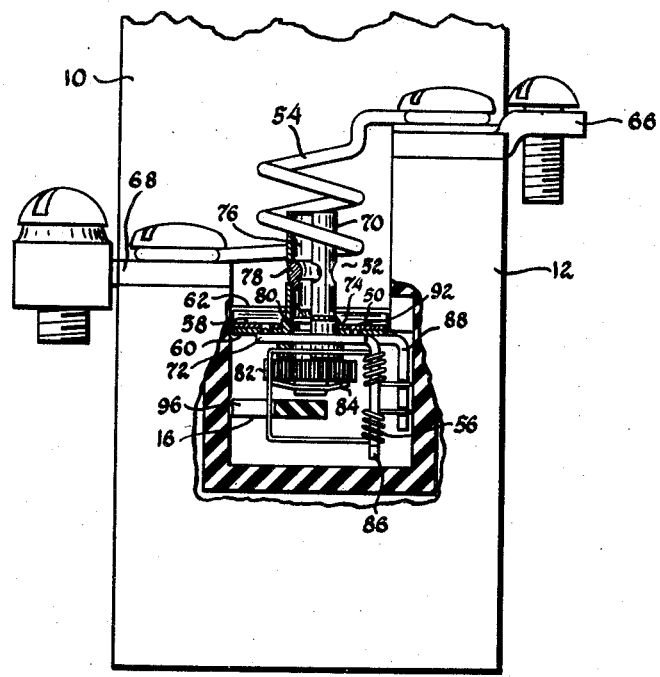
Fig. 2 is a view in end elevation, partly in section, of a fragment of the switch illustrated in Fig. 1.

Referring to Figs. 1 and 2, the thermal overload mechanism by which the slide bar 16 is moved left under overload conditions comprises a bimetallic strip 50, a solder element generally designated 52, a heater coil 54 and a spring 56.

The bimetallic strip 50 comprises two layers. The upper layer 58 has a greater coefficient of expansion with temperature than has the lower layer 60. The strip is held in notches 62 and 64 in bases 10 and 12, respectively, at its left and right ends. The front and back edges of the strip are not fixed to either base. Accordingly, when the strip is heated its central portion bends upwardly.

It is now preferred that the strip be sprung downwardly at the central portion as illustrated in Fig. 2. When it is heated, the central portion bends upwardly. This is illustrated in Fig. 1, where the strip is heated so that its central portion is bent up sufficiently to make the strip straight.

The strip 50 is heated by the heater coil 54. The latter is made of self-supporting resistance wire and its ends are attached to terminal members 66 and 68 on base 12 so that the coil is fixed relatively to said base and is disposed a short distance above the strip 50 with its axis perpendicular to the strip.

The solder element consists of an outer sleeve 70 which is press fitted into an opening 74 in the center of the bimetallic strip 50, a pin 76 disposed in the sleeve 70, a solder connection 78 between the sleeve 70 and pin 76 to prevent relative movement therebetween except when the solder is melted, a retaining ring 80 to prevent relative axial movement between the sleeve 70 and pin 76 and a ratchet wheel 82 which is secured to the lower end of pin 76 by a clip 84.

The upper part of sleeve 70 and pin 76 extend up from strip 50 part way into heater coil 54. Thus the upper portion of the solder element is effectively heated by coil 54 when the latter is connected in series circuit with the device to be protected and is subject to the current flow to said device.

At the same time, strip 50 is heated and its central portion bends up to lift the solder element 52 further into the coil 54 to increase the area or portion of the solder element 52 which is effectively heated by coil 54.

Figure 3:
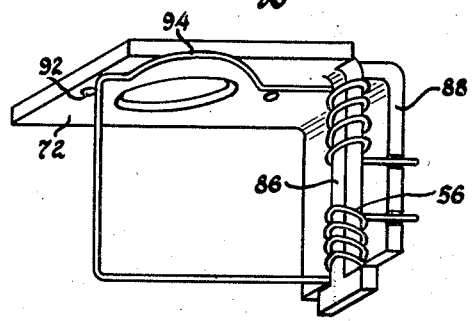
Fig. 3 is a perspective view of a spring and spring retainer for use in the switch illustrated in Fig. 1.

The spring 56 operates like a mouse trap spring. As best illustrated in Fig. 3, it extends outwardly to form a loop from portions which are coiled about a first leg 86 of a spring retainer 72. The extreme ends of spring 56 are engaged in notches in a second leg 88 of the retainer 72 which is spaced laterally from leg 86.

Legs 86 and 88 extend downwardly from a plate which is provided with a central opening to accommodate sleeve 70 of solder element 52 and which is disposed between the enlarged lower end of sleeve 70 and bimetallic strip 50. Relative rotational movement between the spring retainer 72 and the bimetallic element 50 is prevented by projections 92 pressed up from the retainer 72 and accommodated in holes in the bimetallic strip.

The upper portion of the spring loop is bent at 94 to clear the solder element, and the outer portion of the spring loop is engaged in a notch of ratchet wheel 82. It extends from this point down through a notch 96 in slide bar 16 and thence under slide bar 16 to leg 86.

The spring is held by ratchet wheel 82 so that when the solder connection 78 is melted, the spring will tend to unwind to rotate pin 76 and wheel 82 and to force the slide bar 16 to the left in Fig. 1 and forward in Fig. 2. As hereinbefore described, movement of the slide bar 16 results in operation of the switch.

To illustrate the advantage of providing for a change in the area of the solder element which is effectively heated by the coil, it is assumed that the coil and switch are connected in series with an electric motor. When the switch is closed to connect the motor to a power source, inrush current to the motor flows through the coil heating it rapidly. The solder element is heated by radiation and convection and it heats more slowly than does the coil. Before the solder melts, motor speed increases and motor current and coil temperature are reduced and the rate of heating of the solder element is reduced. If the current is greater than a safe current magnitude and if the solder element is not moved further into the coil, a relatively long period of time will elaspe before the solder will be melted. If the solder element is moved further into the coil by provision of bimetallic strip 50, the heating rate of the solder element will be greater and the solder will melt sooner. It is not a statisfactory solution to omit the bimetallic strip and fix the solder element in a position further into the coil because of danger that the solder will melt as a result of heating by the inrush current. Accordingly, the invention is particularly useful in connection with motors which accelerate slowly or where inrush current magnitude is much greater than the value of normal running current.

Moreover the same invention is particularly well suited to protection of motors which accelerate rapidly or in which inrush current is only a little greater than normal running current. Inverting the bimetallic strip so that the solder element is withdrawn from the heater upon heating of the strip, will result in rapid initial heating of the solder element and earlier melting of the solder if the motor current is not diminished as promptly as motor safety requires.

In prior art devices employing only the solder element and coil, the designer could vary only coil resistance, solder melting point, coil-solder element spacing and solder element mass in his attempt to simulate heating in the device to be protected. By applicant's invention the designer is provided not only these variables to work with but relative mass of solder element and bimetallic strip, coil-strip spacing and effective heating area of the solder element as well.

It is to be understood that the bimetallic strip 50 could be replaced with a thermal responsive bellows or a bilayer strip of non-metallic materials having different coefficients of expansion with temperature or other equivalent, well known structures. Similarly, the solder element 52 could be a thermal responsive bellows or a helical bimetallic element or other equivalent, well known device.

I claim:

1. For a protective switch, thermal responsive actuating mechanism comprising in combination, a heater element for connection in series with a circuit or device to be protected and heated by current flow thereto, a bi-metallic strip comprising layers having different co-efficients of expansion with temperature and disposed proximately to said heater element whereby said strip is bent upon being heated as an incident to heating of said heater element by current flow therethrough, a solder element comprising parts interconnected and held against relative movement by solder, and means for causing relative movement of said parts and consequent operation of the switch when said solder is melted, said solder element being disposed proximately to said heater element for effective heating of a portion thereof as an incident to heating of said heater element by current flow therethrough, said bimetallic strip in accordance with the degree of bending thereof effecting relative movement between said solder and heating elements to vary the portion of said solder element effectively subjected to heating by said heating element.

2. The combination according to claim 1 wherein said solder element is moved by said bimetallic strip in accordance with the degree of bending of the latter.

3. For a protective switch thermal responsive actuating mechanism comprising, in combination, a base, a heater element for connection in series with a circuit or device to be protected and heated by current flow thereto, said heater element being fixed relatively to said base, a bi-metallic element comprising layers having different co-efficients of expansion with temperature and having one portion fixed relatively to said base and another portion disposed proximately to said heater element whereby said other portion will be bent upon being heated as an incident to heating of said heater element by current flow therethrough, a solder element mounted on said other portion of said bimetallic element and comprising parts interconnected and held against relative movement by solder and means for causing relative movement of said part and consequent operation of the switch when said solder is melted, said solder element being disposed proximately to said heater element for effective heating of a portion thereof as an incident to heating of said heater element by current flow therethrough and further being so mounted on said bimetallic element that said solder element is moved relatively to said coil as said bimetallic element is bent to vary the portion of said solder element which is effectively heated by said heater element as a function of the degree of bending of said bimetallic element.

4. The combination defined in claim 3 in which said heater element comprises an elongated coil into which said solder element extends an amount less than the length of said coil, and in which movement of the solder element by bending of the bimetallic element varies the area of said solder element which is effectively heated by said heater element.

5. The combination defined in claim 3 in which said means for causing relative movement of the parts of said solder element and consequent operation of the switch when said solder is melted comprises an actuator member movable to a position to actuate said switch, a spring fixed relatively to one part of said solder element and connected to and restrained out of its relaxed position by a second portion of said solder element except when said solder is melted, said spring having a lost motion connection with said actuator and acting when said solder is melted to urge said actuator to a position in which said switch is operated.

6. For an overload protective switch, thermal responsive switch actuating mechanism comprising, in combination, a base, a heater element mounted on said base, a bimetallic element comprising layers having different co-efficients of expansion with temperature, said bimetallic element having one portion fixed relatively to said base and having another portion disposed proximately to said heater coil and movable relatively to said base toward and away from said heater coil as an incident to change in temperature of said bimetallic element caused by change in temperature of the coil, a solder element having a first part carried by the movable portion of said bimetallic element and disposed to be subjected to heating by said heater element in an amount determined by the position of said movable portion of said bimetallic element relatively to said heater element, said solder element having a second part movable relatively to said first part and normally held against such relative motion by a solder connection in which the solder is melted when said first portion is heated to a selected temperature, a switch actuator connected to said second part of said solder element, and bias means for urging said actuator to switch actuating position when said solder connection is melted.

7. For a protective switch, thermal responsive actuating mechanism comprising, a heater element for connection in series with a circuit or device to be protected whereby to be heated as an incident to current flow to said circuit or device, a bimetallic strip comprising layers having different co-efficients of expansion with temperature so that said strip bends with changes in temperature, a solder element comprising first and second relatively movable parts joined by solder to be relatively immovable except when said solder is melted and being disposed to have an area thereof effectively heated by said heater element, said heater element and said solder element being mounted for relative movement with respect to each other and said bimetallic strip having at least one point fixed relatively to one of said elements and being disposed so that another portion thereof is heated and bent by heat from said heater element, said other of said elements being connected to said other portion of said bimetallic strip and being moved by bending of said portion of said bimetallic strip upon heating of the latter to vary the effective area of said solder element which is heated by said heater element in accordance with the degree of bending of said bimetallic element, and means tending to actuate said switch and being connected to the other of said part of said solder element and restrained from actuating said switch unless said solder is melted.

8. The combination according to claim 7 wherein said one of said elements is the heater element and said other of said elements is the solder element.

9. For a protective switch, thermal responsive actuating mechanism comprising, a base, a heater element or connection in series with a circuit or device to be protected whereby to be heated as an incident to current flow to said circuit or device, said heater element being connected to and immovable relatively to said base, a bimetallic strip comprising layers having different co-efficients of expansion with temperature and having end points fixed to said base so that the central portion of said strip bends with changes in temperature, the solder element comprising a first part connected to the central portion of said strip and a second part movable relatively to said first part joined by solder to said first part to be relatively immovable therewith except when said solder is melted, said first part of said solder element being disposed proximately to said heater element whereby an area thereof is effectively heated by said heater element and so that said strip is heated by said heater element whereby said strip is bent as an incident to heating by said heater element.

10. For a protective switch, thermal responsive switch actuating mechanism comprising, a heater element for connection in series with a circuit or device to be protected and heated by current flow thereto, a first thermal responsive element disposed proximately to said heater element and responsive to change in temperature to change one of its dimensions, an actuator movable to operate the switch, a second thermal element operatively connected with said actuator and responsive at a selected temperature to move said actuator to operate said switch, said second thermal element being disposed proximately to said heater element for effective heating thereby, and one of said heater element or said second thermal responsive element being movable relatively to the other by said first thermal responsive element as an incident to change in said dimension of the latter to vary the effective heating of said second thermal responsive element by said heater element.

11. For a protective switch, thermal responsive switch actuating mechanism comprising, a base, a heater element for connection in series with a circuit or device to be protected and heated by current flow thereto, a first thermal responsive element disposed proximately to said heater element and having a portion fixed relatively to said base and another portion responsive to change in temperature to move relatively to said base toward and away from said heater element, an actuator movable to operate the switch, a second thermal element operatively connected with said actuator and responsive at a selected temperature to move said actuator to operate said switch, said second thermal element being disposed proximately to said heater element for effective heating thereby, and one of said heater element or said thermal responsive element being fixed relatively to said base and the other being movable by said other portion of said first thermal responsive element as an incident to change in the position of the latter relative to said base to vary the effective heating of said second thermal responsive element by said heater element.

12. The combination defined in claim 11, in which said second thermal responsive element is carried by and movable with said other portion of said first thermal responsive element.

References Cited in the file of this patent
UNITED STATES PATENTS

| 2,310,531 | Kuhn et al. | Feb. 9, 1943 |
| 2,371,018 | Ashworth et al. | Mar. 6, 1945 |
| 2,450,600 | Kuhn | Oct. 5, 1948 |
| 2,673,268 | Kuhn et al. | Mar. 23, 1954 |